(No Model.)

E. W. HERENDEEN.
HARROW.

No. 382,304. Patented May 8, 1888.

WITNESSES.
Albert E. Leach.
M. W. Marston.

INVENTOR
Edward W. Herendeen,
By his Attorney,
W. B. H. Dowse.

UNITED STATES PATENT OFFICE.

EDWARD W. HERENDEEN, OF GENEVA, NEW YORK.

HARROW.

SPECIFICATION forming part of Letters Patent No. 382,304, dated May 8, 1888.

Application filed September 7, 1887. Serial No. 249,030. (No model.)

*To all whom it may concern:*

Be it known that I, EDWARD W. HERENDEEN, a citizen of the United States, residing at Geneva, in the county of Ontario and State of New York, have invented certain new and useful Improvements in Spring-Tooth Harrows, of which the following is a specification.

My invention consists of an improved spring harrow-tooth and an improved method of attaching the same to the harrow-frame, whereby an easy and quick adjustment of the tooth is insured, and at the same time the tooth is held firmly in place and the tendency to break reduced to a minimum.

Figure 1:
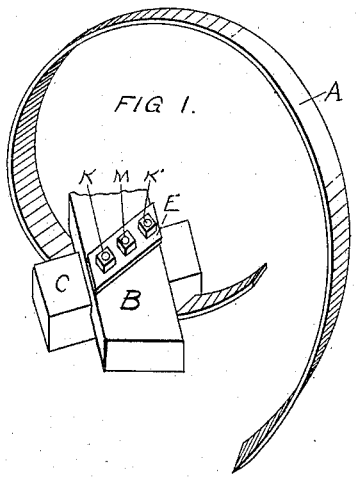
Figure 2:
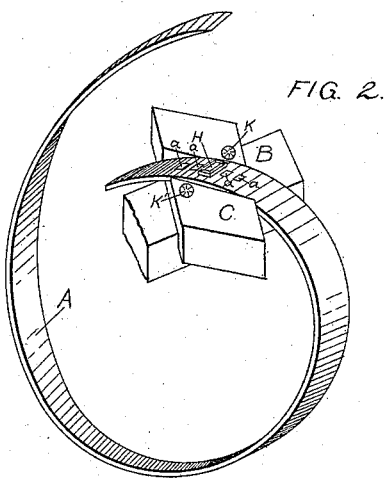
Figure 3:
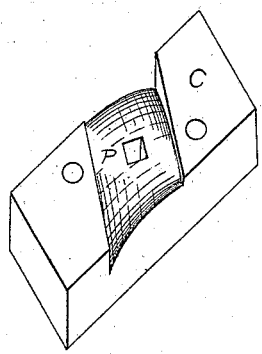
Figure 4:
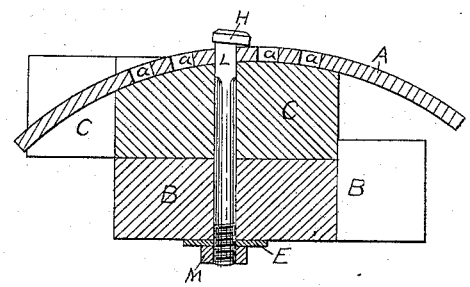
Figure 5:
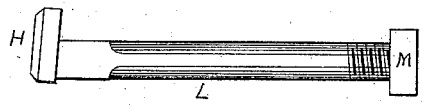
Figure 6:
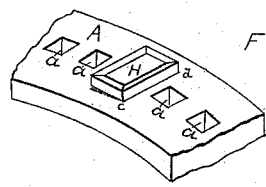

Figure 1 of the accompanying drawings shows in perspective a spring-tooth attached to the harrow-frame, according to my improved method. Fig. 2 is a view of the same inverted. Fig. 3 represents the curved seat. Fig. 4 is a section through the tooth and frame. Fig. 5 shows the form of fastening-bolt employed. Fig. 6 shows the head of the bolt and its peculiar bearing on the harrow-tooth.

A is the harrow-tooth provided near its upper end with a series of holes, $a\ a$.

B is a portion of the harrow-frame, and C is a beam firmly fastened to the frame, preferably by bolts K K', and having a groove, P, crossing it obliquely. The bottom of the groove is made convex, as shown in Fig. 3, forming a curved seat for the tooth A, which is secured thereto by the bolt L. The upper portion of the bolt L is preferably made square, and is provided with a rectangular head, H, located not centrally with respect to the axis of the bolt, but with the bolt preferably nearer one side than the other and slightly inclined to the head, as shown in Figs. 4 and 5. When the bolt is passed through one of the holes $a$ and through the pieces C and B and secured firmly by means of the nut M, the head H of the bolt bears on the tooth A only along the line $c\ c'$, Fig. 6, at some distance in front of the hole in which the bolt is inserted. Thus the strain is brought to bear on a portion of the tooth left with its complete section, instead of bearing directly at the hole, thereby removing any danger of the tooth breaking at the hole.

There are many advantages gained by attaching a spring-tooth to the frame by a bolt instead of by a clip, according to the most common method. In all forms of attachment where clips are used and simple pressure brought upon the tooth to hold it it is found in practice that the tooth is likely to soon become loose and work backward upon the seat, thus getting out of proper adjustment.

If a wood frame is used, in a wet season the wood becomes swollen with water and the fibers are pressed together around the tooth, so that afterward in dry weather, when the wood shrinks, the tooth is loosened and slips out of place. This difficulty cannot occur when a bolt is employed passing through the tooth. Again, by the use of a bolt and a series of holes made at corresponding distances from the end in each tooth, the adjustment of the tooth is effected much more quickly and easily than when clips are employed. Hitherto when bolts have been used for this purpose they have been of the ordinary kind, bearing flatly around the hole in the tooth, and thus rendering the tooth more liable to breakage than when the clip is used. By using the peculiar kind of bolt herein described this danger of breakage is removed, and the bolt, in connection with the curved seat, renders it impossible for the tooth to work loose.

What I claim is—

1. A harrow-tooth provided with one or more holes for receiving the fastening-bolt, in combination with a harrow-frame, and a fastening-bolt having an inclined head, whereby only an edge bears along the tooth at some distance from the hole, substantially as set forth.

2. In a harrow, a fastening-bolt having its head inclined so as to bear only along one edge and at some distance from the hole in which it is inserted, in combination with a curved harrow-tooth provided with a graduated series of attachment holes, substantially as described.

In witness whereof I have hereunto set my hand.

EDWARD W. HERENDEEN.

Witnesses:
S. H. PARKER,
H. E. PARKER.